A. B. BEAN
CLUTCH.

No. 186,296.  Patented Jan. 16, 1877.

Witnesses:

Albert B. Bean
Inventor
By Atty.

UNITED STATES PATENT OFFICE.

ALBERT B. BEAN, OF NEW HAVEN, CONNECTICUT, ASSIGNOR TO DENNIS FRISBIE, OF SAME PLACE.

IMPROVEMENT IN CLUTCHES.

Specification forming part of Letters Patent No. 186,296, dated January 16, 1877; application filed October 2, 1876.

*To all whom it may concern:*

Be it known that I, ALBERT B. BEAN, of New Haven, in the county of New Haven and State of Connecticut, have invented a new Improvement in Machinery-Clutches; and I do hereby declare the following, when taken in connection with the accompanying drawings and the letters of reference marked thereon, to be a full, clear, and exact description of the same, and which said drawings constitute part of this specification, and represent, in—

Figure 1:
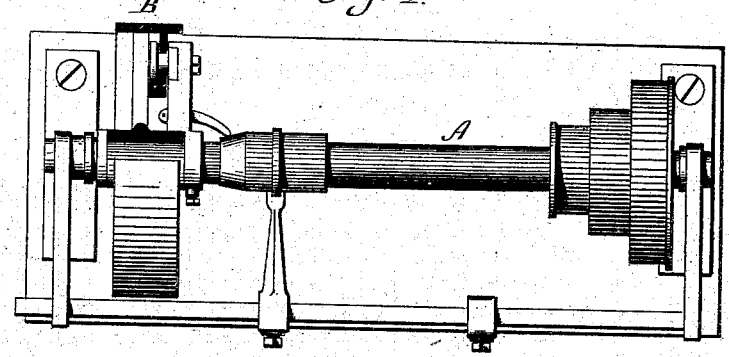
Figure 2:
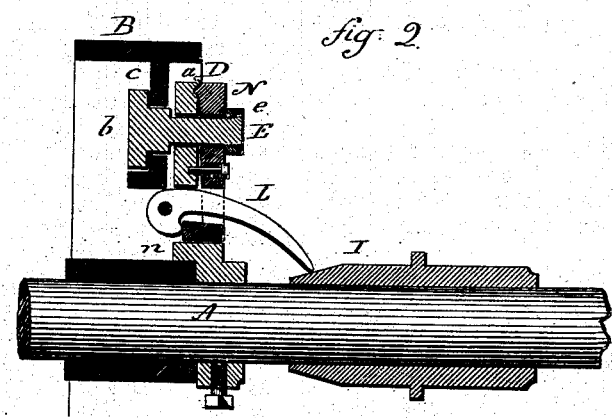
Figure 3:
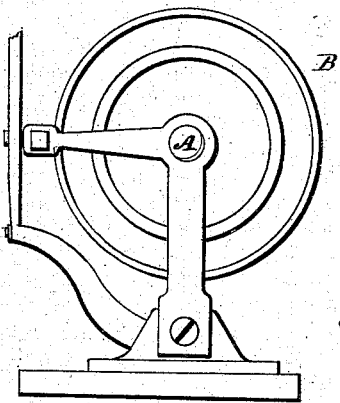

Figure 1, a sectional plan view; Fig. 2, a longitudinal sectional view enlarged; and in Fig. 3, an end view.

This invention relates to an improvement in machinery-clutches, with special reference to the clutch for which Letters Patent were granted to me, dated March 3, 1874, No. 148,165.

The invention consists in the peculiar arrangement of mechanism, whereby the pulley is clutched or engaged with the shaft, as hereinafter described, and as recited in the claim.

A represents the shaft; B, a pulley loose thereon. The pulley B is constructed or provided with a flange, C, extending from the rim toward the shaft—that is to say, in a plane with the pulley.

Rigidly on the shaft an arm, D, is arranged, extending outward to form a face, a, which lies in close proximity to one face of the flange C. Through the outer end of this arm, and substantially parallel with the shaft, is a spindle, E, with a head, b, upon the side of the flange opposite to the arm D, the said head forming a second bearing-surface upon the flange, which, with the bearing-face of the arm D, forms a clamp to gripe the said flange C.

A lever, N, is hung upon the outside of the post, with a fulcrum above the spindle, and extending below the spindle. Through this lever N a second lever, L, is arranged, with its fulcrum upon the post, the shorter arm $n$ bearing upon the inside of the lever N. The other arm, extending outward, rests upon an inclined surface of the sleeve I. The levers L and N, thus combined, form a compound lever to operate the clamping device.

The spindle E extends through the lever N, and there secured by a nut, $e$, so that when the parts are in their normal condition the shaft, with the arm D and spindle, will revolve free, or be independent of the pulley B; but when the sleeve I is moved longitudinally, so as to raise the outer end of the lever L, then the lever N will be correspondingly moved upon its fulcrum, thereby causing the head $b$ of the spindle to bear with force against the inside of the flange C of the pulley, and thus engage the flange with the arm, so as to cause the pulley and shaft to revolve together.

The sleeve I is moved by the usual shipping mechanism for machinery-clutches, which is too well known to require description. For heavy work, several of these arms D and the compound levers may be arranged at different points around the shaft to simultaneously engage the flange.

I claim—

In a machinery-clutch, the combination of the following elements: first, a pulley loose upon the shaft, provided with a concentric clutch-flange; second, an arm rigid on the shaft, and projecting outward to form one of the bearing-surfaces to gripe the said clutch; third, a second adjustable bearing-surface to act upon the clutch-flange, in connection with the said rigid arm; fourth, a lever having its fulcrum on the said arm, and connected to the said second adjustable bearing-piece, and a second lever hung to the said rigid arm, forming with the said first lever a compound lever; and, fifth, a sleeve or slide movable on the shaft, for actuating the said compound lever, substantially as specified.

ALBERT B. BEAN.

Witnesses:
 JOHN E. EARLE,
 CLARA BROUGHTON.